(12) United States Patent
Grant et al.

(10) Patent No.: US 8,054,347 B2
(45) Date of Patent: Nov. 8, 2011

(54) IMAGE SENSOR SYSTEMS HAVING IMPROVED NOISE PERFORMANCE

(75) Inventors: David Grant, Edinburgh (GB); Andrew Kinsey, Burntisland (GB); Ed Duncan, Edinburgh (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 841 days.

(21) Appl. No.: 11/972,427

(22) Filed: Jan. 10, 2008

(65) Prior Publication Data

US 2008/0170144 A1    Jul. 17, 2008

(30) Foreign Application Priority Data

Jan. 12, 2007   (EP) .................................... 07270004

(51) Int. Cl.
*H04N 9/64* (2006.01)
(52) U.S. Cl. .......................... 348/245; 348/241; 348/243
(58) Field of Classification Search .................... 348/245
See application file for complete search history.

(56) References Cited

U.S. PATENT DOCUMENTS 6,101,287 A * 8/2000 Corum et al. ................. 382/274
2007/0146508 A1* 6/2007 Oshima ......................... 348/243

FOREIGN PATENT DOCUMENTS

WO    WO-99/62023    12/1999

OTHER PUBLICATIONS

European Search Report and Written Opinion, EP 07 27 0004, dated Feb. 15, 2007.

* cited by examiner

*Primary Examiner* — Anthony J Daniels
(74) *Attorney, Agent, or Firm* — Gardere Wynne Sewell LLP

(57) ABSTRACT

A light-sensitive pixel array has an active area and an additional area of optically shielded pixels. A "noise figure" is derived as a measure of the prevalence of noise in the image signal without being affected by the presence of moving detail in the image. The noise figure is derived by measuring the difference in output between the pixels of at least one pair of pixels in the optically shielded area in one frame, repeating this measurement in a subsequent frame, and then subtracting one pixel pair difference from the other to give a difference of differences. In a preferred form, four pairs of pixels are used. The noise figure may be used to control digital signal processing of the image signal, such as be smoothing.

27 Claims, 1 Drawing Sheet

IMAGE SENSOR SYSTEMS HAVING IMPROVED NOISE PERFORMANCE

PRIORITY CLAIM

The present application claims priority from European Application for Patent No. 07270004.0 of the same title filed Jan. 12, 2007, the disclosure of which is hereby incorporated by reference.

BACKGROUND

1. Technical Field of the Invention

The present invention relates to the estimation and amelioration of noise in image sensor systems.

2. Description of Related Art

The outputs of image sensor systems inherently contain noise. Noise may arise from many sources, for example by the inherent physics of the image sensor device (thermal noise, Schott noise) or at the system level though interference, crosstalk, or even poor power supply routing. If the signal/noise ratio is sufficiently high the displayed image will be perceptibly degraded, for example by speckling or striping depending on the nature and origin of the noise.

Many efforts have been made over the years to address problems related to noise. One line of approach is to use digital signal processing. Many complex image processing DSP designs have been devised using fuzzy or deterministic algorithms, but cannot always be depended upon. One reason for this is that reliably differentiating between random noise and real image data has been a known problem for many years. Image processing is more likely to fail in real scenes where there is a lot of scene detail, i.e. the scene contains an amount of genuine high frequency animated information such as blades of grass or tree leaves. This detail is likely to be interpreted as noise, and the resulting processing as by smoothing or other algorithms will remove or modify essential detail and so compromise the perceived quality of the resultant image.

There is a need in the art to address these issues by providing a novel approach to assessing the "noisiness" of image signals.

SUMMARY

In an embodiment a method of assessing the prevalence of noise in an image signal forming the output of an image sensor having an array of pixels, comprises: providing a reference area of the pixel array which is shielded from incident light; defining at least one pair of pixels within the reference area; measuring the difference in output between the pixels of said pair in a first image frame; measuring the difference in output between the pixels of said pair in a second image frame displaced in time from said first image frame; and deriving a noise value from the change in said differences between the first and second image frames.

Said plurality of pairs of pixels are preferably defined within a single line of the reference area. Preferably four pairs of pixels are used. Preferably also, the pixels of the or each pair are spaced apart from each other in the line direction.

The reference area may also be used as a reference source for other purposes, for example as a black current reference in the cancellation of thermal noise.

In another embodiment a method of producing an image from an image sensor having an array of pixels, comprises: deriving a noise value by the method defined above, and effecting digital signal processing on the output of the image sensor to improve the final image, the digital signal processing being varied in accordance with the noise value.

The digital signal processing may suitably comprise smoothing.

In yet another embodiment an image sensor system comprises: an image sensor having an active area comprising an array of pixels, a predetermined part of the active area being shielded from incident light to provide a reference area, the remainder of the active area providing image signals; and noise evaluation means for evaluating the prevalence of noise in the image signals. The noise evaluation means comprises: means for measuring the difference in output between the pixels of at least one pair of pixels in said reference area in each of time-spaced image frames; and means for deriving a noise value, representing the prevalence of noise in the image signals, from the change in said differences between pairs of said image frames.

Typically, the means for measuring is arranged to measure the difference in output between the pixels of a plurality of pairs of pixels in a single line of the reference area, most preferably the difference in output between the pixels of four pairs of pixels.

The pixels of each pair are preferably spaced apart from each other in the line direction.

The system preferably includes a digital signal processing means operative to modify the sensor output signal in dependence on said noise value, for example by smoothing.

The reference area may additionally supply an output used in canceling fixed noise in the sensor.

According to further aspects, there is provided a digital still camera, camcorder, mobile telephone comprising a digital camera, webcam, optical pointing device (e.g. mouse) or barcode reader comprising the method and system of the embodiments.

BRIEF DESCRIPTION OF THE DRAWINGS

The present invention will now be described, by way of example only, with reference to the accompanying drawings, in which.

DETAILED DESCRIPTION OF THE DRAWINGS

Figure 1:
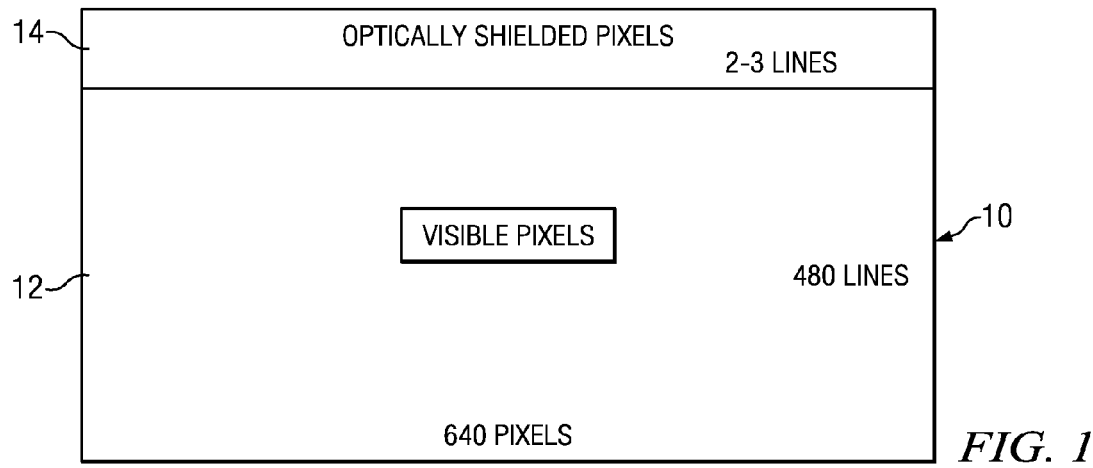
FIG. 1 is a diagrammatic illustration of the active area of an image sensor.

Referring to FIG. 1, a typical solid state image sensor 10 of known type has an active area 12 comprising 640 by 480 pixels on which an optical image is formed by a suitable lens system. It will be understood that the number of pixels given here is only for purposes of illustration and that the systems and methods can be applied to a pixel array of any size. An additional area 14 contains two or three lines of pixels which are electrically identical to the pixels of the active area 12 but which are optically shielded from incident light, for example by being covered with a metallized layer or a layer of black print. Such an arrangement is known, the additional area 14 being used, for example, to provide an indication of the dark current of pixels in the sensor. Again, the reference area thus formed is not restricted in extent to two or three lines of pixels. It may be a greater or lesser number of lines, or may extend just to a portion of one or more lines. The optically shielded area, such as the additional area 14, is used to enable improved handling of noise.

Figure 2:
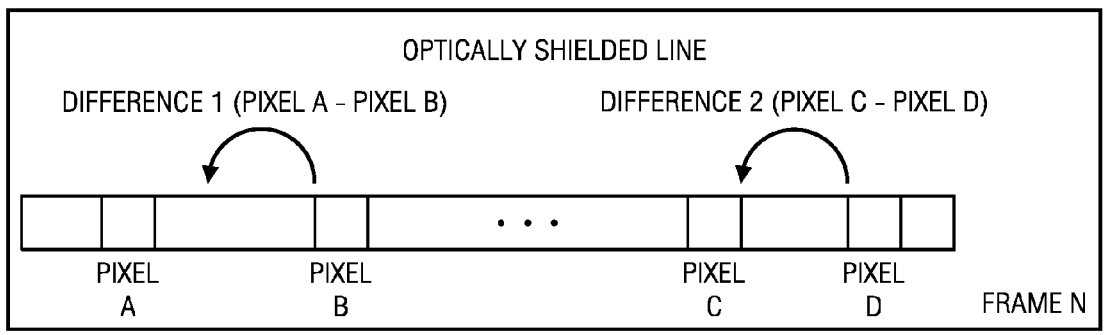
FIG. 2 illustrates part of a method in one embodiment.
Figure 3:
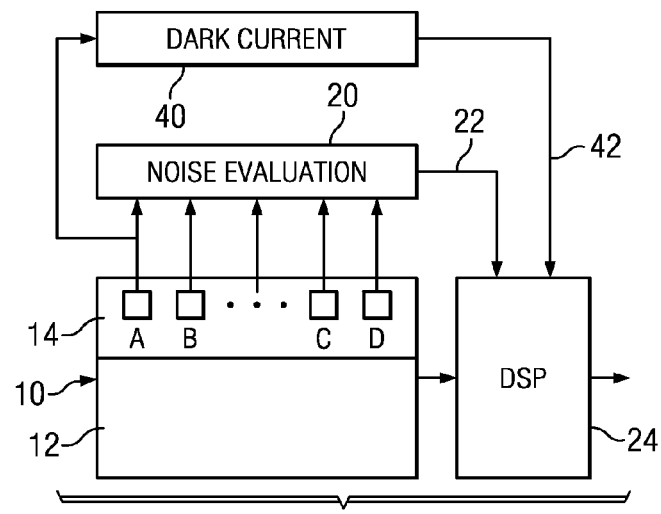
FIG. 3 is a system level block diagram of an embodiment.

Referring to FIGS. 2 and 3, one exemplary application, presented in the case of a video signal, will be described. Pairs of pixels are selected in one of the optically shielded rows, in FIG. 2 pixels A/B and C/D. As shown, it is preferable that the pixels of a given pair are not immediately adjacent, but are separated by some pixel spaces in the row. Any number of such pixel pairs may be used; empirically, it has been found that four pairs are sufficient, with any greater number not significantly improving performance.

A noise evaluation circuit 20 (see FIG. 3) operates on the output from the pixel pairs.

In a first stage of noise evaluation circuit 20 operation, the difference between the pixel values within each pair is determined and the difference value is stored.

The system operates on a temporal, frame-to-frame basis with the difference value for each pixel pair in a given frame being compared by the noise evaluation circuit 20 with the equivalent value in the preceding frame.

$$\text{Noise Figure}_m = (\text{Pixel } A_n - \text{Pixel } B_n)_m - (\text{Pixel } A_n - \text{Pixel } B_n)_{m-1}$$

The result is a set of second order pixel pair differences (difference of differences across frames) which also compensates for any fixed offsets associated with either or both of the pixel pair elements.

Individual noise figures can be used directly or can be averaged to produce a single noise figure per image:

$$\text{Noise Figure}_{avg} = \Sigma(n=1 \ldots n=\text{num\_samples})(\text{Pixel } A_n - \text{Pixel } B_n)_m - (\text{Pixel } A_n - \text{Pixel } B_n)_{m-1}/\text{num\_samples}$$

The noise figures achieved in either of these ways can then be output 22 for use by an image processing subsystem (perhaps in the form of a digital signal processor) 24 to adjust image processing parameters to render the most subjectively attractive image. Suitable image processing subsystems are well known per se and need not be described herein, but include well proven techniques such as data smoothing or contrast manipulation as implemented in the DSP.

A dark current detector 40 additionally supplies an output 42 used by the DSP 24 in canceling fixed noise in the sensor.

A simple and reliable means of detecting and measuring the extent of image noise is accordingly provided. The Noise FIG. 22 is not derived by using image processing in an attempt to differentiate between real image data and noise. The Noise FIG. 22 is not affected by image data, being derived from optically shielded pixels and can therefore be relied upon as a robust control for effective noise management.

Although described above with reference to a video signal, the system and method may also be applied to the production of still images by exposing a number of frames (for example, two or three frames) sequentially and outputting only one of these as the still image, with the noise figure obtained from the comparison of optically shielded pixels being applied to the final output frame.

The system and method can be implemented in a number of devices 30 comprising image sensing systems, which include but are not limited to a digital still camera, camcorder, mobile telephone comprising a digital camera, webcam, optical pointing device (e.g. mouse) or barcode reader and other machine vision systems. The practicalities of implementing the invention in each of these devices is straightforward to one skilled in the art and so does not need to be discussed in more detail herein.

Various modifications and improvements can be made to the above without departing from the scope of the present invention.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method of assessing the prevalence of noise in an image signal forming the output of an image sensor having an array of pixels, comprising: providing a reference area in the image sensor including a pixel array which is shielded from incident light; defining at least one pair of pixels within the reference area; and processing by a noise evaluator of signal output from at least one pair of pixels by: measuring a first difference in output between the pixels of said pair in a first image frame; measuring a second difference in output between the pixels of said pair in a second image frame displaced in time from said first image frame; and deriving a noise value from a determined change in said first and second measured differences between the first and second image frames.

2. The method of claim 1, wherein defining comprises defining a plurality of pairs of pixels that are defined within a single line of the reference area.

3. The method of claim 2, in which four pairs of pixels are defined.

4. The method of claim 1, in which the pixels in each pair are spaced apart from each other in the line direction.

5. The method of claim 1, in which the reference area is also used as a reference source for other purposes.

6. The method of claim 5, in which the reference area is used as a black current reference in the cancellation of thermal noise.

7. The method of claim 1, further comprising digital signal processing the image signals based on the noise value to generate an output of the image sensor.

8. The method of claim 7, in which the digital signal processing comprises smoothing.

9. A method of producing an image from an image sensor having an array of pixels, comprising:
deriving a noise value by:
measuring, during a first image frame, a first difference in output between pixels in a pixel pair located within a portion of a pixel array of the image sensor which is shielded from incident light;
measuring, during a second image frame displaced in time from said first image frame, a second difference in output between the pixels of said pixel pair; and
measuring a change in said first and second measured differences between the first and second image frames to generate the noise value, and
effecting digital signal processing on the output of the image sensor, wherein parameters of the digital signal processing are adjusted by the noise value.

10. The method of claim 9, in which the digital signal processing comprises smoothing.

11. An image sensor system, comprising:
an image sensor having an active area comprising an array of pixels, a predetermined part of the active area being shielded from incident light to provide a reference area, the remainder of the active area providing image signals;
a noise evaluator configured to evaluate the prevalence of noise in the image signals by:
measuring differences in output between the pixels of at least one pair of pixels in said reference area in each of a plurality of time-spaced image frames; and deriving a noise value, representing the prevalence of noise in the image signals, from a determined change in said measured differences between pairs of said image frames.

12. The image sensor system according to claim 11, wherein the at least one pair of pixels is a plurality of pairs of pixels in a single line of the reference area.

13. The image sensor system according to claim 12, wherein the plurality of pairs of pixels comprises four pairs of pixels.

14. The image sensor system according to claim 11, in which the pixels of each pair are spaced apart from each other in the line direction.

15. The image sensor system according to claim 11, further comprising a digital signal processing circuit operative to modify the sensor output signal in dependence on said noise value.

16. The image sensor system according to claim 11, wherein the reference area additionally supplies an output used in canceling fixed noise in the sensor.

17. The image sensor system according to claim 11, wherein the system is selected from the group of devices consisting of: a camcorder; a digital camera.

18. The image sensor system according to claim 11, wherein the system is selected from the group of devices consisting of: a mobile telephone; a webcam; an optical pointing device; a barcode reader.

19. A method of assessing the prevalence of noise in an image signal forming the output of an image sensor having an array of pixels, comprising: processing by a noise evaluator of signals output from the array of pixels by: measuring, during a first image frame, a first difference in output between pixels in a pixel pair located within a portion of the array of pixels within the image sensor pixel array which is shielded from incident light; measuring, during a second image frame displaced in time from said first image frame, a second difference in output between the pixels of said pixel pair; and measuring a change in said first and second measured differences between the first and second image frames to generate a noise value.

20. The method of claim 19 further comprising processing the output image signal based on the noise value.

21. The method of claim 20, wherein processing comprises smoothing the image, and wherein parameters of the smoothing performed are adjusted based on the noise value.

22. The method of claim 19, wherein the pixel pair comprises a plurality of pairs of pixels that are defined within a single line of the reference area.

23. The method of claim 19, in which the pixels in each pair are spaced apart from each other in the line direction.

24. The method of claim 1 wherein the determined change comprises calculating a difference between said first and second measured differences to provide the noise value.

25. The method of claim 24 wherein the pixel pair includes a first pixel and a second pixel;
wherein measuring the first difference comprises subtracting one of the first and second pixel outputs from the other of the first and second pixel outputs with respect to the first image frame;
wherein measuring the second difference comprises subtracting one of the first and second pixel outputs from the other of the first and second pixel outputs with respect to the second image frame; and
wherein calculating the difference comprises subtracting one of the first and second measured differences from the other of the first and second measured differences.

26. A method of producing an image from an image sensor having an array of pixels, comprising:
deriving a noise value by:
measuring, during a first image frame, a first difference in output between pixels in a pixel pair located within a portion of a pixel array which is shielded from incident light;
measuring, during a second image frame displaced in time from said first image frame, a second difference in output between the pixels of said pixel pair; and
measuring a change in said first and second measured differences between the first and second image frames to generate the noise value using a noise evaluator, and
effecting digital signal processing on the output of the image sensor, wherein parameters of the digital signal processing are adjusted by the noise value.

27. A method of assessing the prevalence of noise in an image signal forming the output of an image sensor having an array of pixels, comprising: processing by a noise evaluator of signals output from the array of pixels by: measuring, during a first image frame, a first difference in output between pixels in a pixel pair located within a portion of the array of pixels which is shielded from incident light; measuring, during a second image frame displaced in time from said first image frame, a second difference in output between the pixels of said pixel pair; and measuring a change in said first and second measured differences between the first and second image frames to generate a noise value using a noise evaluator.

* * * * *